(12) United States Patent
Gupta et al.

(10) Patent No.: US 11,573,804 B2
(45) Date of Patent: Feb. 7, 2023

(54) SYSTEMS AND METHODS FOR OPTIMIZED CLUSTER RESOURCE UTILIZATION

(71) Applicant: JPMorgan Chase Bank, N.A., New York, NY (US)

(72) Inventors: Akhilesh Gupta, West Chester, PA (US); Ratikanta Mishra, Bear, DE (US); Suman Kumar Addanki, Chadds Ford, PA (US); Samleo Joseph, Glen Mills, PA (US); Phaneendra Vijay Mukkamala, Glen Mills, PA (US); Ramnath Mahale, West Chester, PA (US); Michael Aguiling, Tappan, NY (US); James P. Cuddihy, Verona, NJ (US); Jay Rajaram, North Brunswick, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/475,040

(22) Filed: Sep. 14, 2021

(65) Prior Publication Data

US 2022/0004392 A1   Jan. 6, 2022

Related U.S. Application Data

(63) Continuation of application No. 16/220,680, filed on Dec. 14, 2018, now Pat. No. 11,144,325.
(Continued)

(51) Int. Cl.
*G06F 13/00* (2006.01)
*G06F 9/38* (2018.01)
(Continued)

(52) U.S. Cl.
CPC .......... *G06F 9/3891* (2013.01); *G06F 9/4881* (2013.01); *G06F 9/5077* (2013.01); *G06F 2209/5011* (2013.01)

(58) Field of Classification Search
CPC .... G06F 9/3891; G06F 9/4881; G06F 9/5077; G06F 2209/5011; G06F 9/5061
(Continued)

(56) References Cited

U.S. PATENT DOCUMENTS 8,706,798 B1   4/2014  Suchter et al.
8,849,891 B1   9/2014  Suchter et al.
(Continued)

OTHER PUBLICATIONS

International Search Report and Written Opinion of the International Searching Authority, dated Mar. 8, 2019, from corresponding International Application No. PCT/US2018/065977.
(Continued)

*Primary Examiner* — Kenneth R Coulter
(74) *Attorney, Agent, or Firm* — Greenberg Traurig LLP

(57) ABSTRACT

Systems and methods for optimizing cluster resource utilization are disclosed. Systems and methods for optimizing cluster resource utilization are disclosed. In one embodiment, in an information processing apparatus comprising at least one computer processor, a method for optimizing cluster resource utilization may include: (1) retrieving cluster usage information for at least one cluster resource in a multi-tenant environment; (2) determining tenant usage for the cluster resource for each of a plurality of tenants; (3) determining a tenant resource commitment for the cluster resource for each tenant; and (4) presenting tenant usage and tenant resource commitment for each resource.

16 Claims, 18 Drawing Sheets

Related U.S. Application Data

(60) Provisional application No. 62/599,382, filed on Dec. 15, 2017.

(51) Int. Cl.
    *G06F 9/48* (2006.01)
    *G06F 9/50* (2006.01)

(58) Field of Classification Search
    USPC .............. 709/226, 229, 232–235, 248, 249
    See application file for complete search history.

(56) References Cited

U.S. PATENT DOCUMENTS

| | | | |
|---|---|---|---|
| 9,325,593 | B2 | 4/2016 | Suchter et al. |
| 9,454,294 | B2 | 9/2016 | Sapuram et al. |
| 9,602,423 | B2 * | 3/2017 | Suchter ............... H04L 43/04 |
| 9,647,955 | B2 | 5/2017 | Suchter et al. |
| 10,133,608 | B2 | 11/2018 | Sapuram et al. |
| 10,355,946 | B1 * | 7/2019 | Dolas ............... H04L 43/0817 |
| 11,144,325 | B2 * | 10/2021 | Gupta ............... G06F 9/3891 |
| 2008/0239985 | A1 | 10/2008 | Karve et al. |
| 2013/0179289 | A1 | 7/2013 | Calder et al. |
| 2013/0297655 | A1 | 11/2013 | Narasayya et al. |
| 2014/0282525 | A1 | 9/2014 | Sapuram et al. |
| 2015/0006716 | A1 * | 1/2015 | Suchter ............... G06F 9/5038 709/224 |
| 2015/0026336 | A1 | 1/2015 | Suchter et al. |
| 2015/0381453 | A1 | 12/2015 | Skjolsvold et al. |
| 2016/0357611 | A1 | 12/2016 | Sapuram et al. |
| 2016/0373370 | A1 | 12/2016 | Suchter et al. |
| 2017/0262769 | A1 | 9/2017 | McShane et al. |
| 2017/0264564 | A1 | 9/2017 | Suchter et al. |
| 2017/0302586 | A1 | 10/2017 | Suchter et al. |
| 2017/0339156 | A1 | 11/2017 | Gupta et al. |
| 2019/0171495 | A1 * | 6/2019 | Knaup ............... G06F 9/5088 |
| 2019/0205173 | A1 | 7/2019 | Gupta et al. |

OTHER PUBLICATIONS

Korhonen. "Analyzing Resource Usage on Multi Tenant Cloud Cluster for Invoicing.", Master's Thesis, University of Oulu, Nov. 2017 (Nov. 2017).

MAPR Technologies, JNC; "Multi-tenancy with MapR" May 2017 (May 2017), MAPR technologies. Inc, Technical Brief.

Nair, Vinod; "Multitenancy on Hadoop: Is your cluster half full?" Feb. 24, 2016 (Feb. 24, 2016), ORielly Media Inc.

Vavilapalu, Vinod Kumar at al.; "Apache Hadoop YARN: Yet another resource negotiator." In: Proceedings of the 4th annual Symposium on Cloud Computing. Oct. 3, 2013 (Oct. 3, 2013).

* cited by examiner

SYSTEMS AND METHODS FOR OPTIMIZED CLUSTER RESOURCE UTILIZATION

RELATED APPLICATIONS

This application is a Continuation of U.S. patent application Ser. No. 16/220,680, now U.S. Pat. No. 11,144,325, filed Dec. 14, 2018, which claims priority to U.S. Provisional Patent Application Ser. No. 62/599,382, filed Dec. 15, 2017, the disclosure of each of which is hereby incorporated, by reference, in its entirety.

The following applications are hereby incorporated, by reference, in their entireties: U.S. patent application Ser. Nos. 62/340,284; 15/602,339 (now U.S. Pat. No. 10,873,582); and Ser. No. 15/860,021 (now U.S. Pat. No. 10,713,092).

BACKGROUND OF THE INVENTION

1. Field of the Invention

The present disclosure generally relates to systems and methods for optimizing cluster resource utilization.

2. Description of the Related Art

Multi-tenancy in a multi-cluster environment may accommodate a growing variety of data-intensive workloads sharing the same host infrastructure that demand storage and compute based on their respective use cases. Traditional approaches of metering resources are often based on hardware characteristics, such as compute and storage, which may be predefined by the tenant. In a multi-tenant environment, however, the possibilities of resource (hardware) optimization based on load types, such as how to account for sharing of resources efficiently in a multi-tenant environment and how to chargeback services based on their workload, are not considered.

SUMMARY OF THE INVENTION

Systems and methods for optimizing cluster resource utilization are disclosed. In one embodiment, in an information processing apparatus comprising at least one computer processor, a method for optimizing cluster resource utilization may include: (1) retrieving cluster usage information for at least one cluster resource in a multi-tenant environment; (2) determining tenant usage for the cluster resource for each of a plurality of tenants; (3) determining a tenant resource commitment for the cluster resource for each tenant; and (4) presenting tenant usage and tenant resource commitment for each resource.

In one embodiment, the method may further include aggregating and storing the tenant usage for the cluster resource in a database.

In one embodiment, the cluster resource may be one of memory, CPU, and storage.

In one embodiment, the cluster usage information may include Yarn queue utilization data.

In one embodiment, the tenant usage for the Yarn queue utilization data may be determined based on tenant mapping.

In one embodiment, the cluster usage information may include Impala pool usage information.

In one embodiment, the cluster usage information may include HDFS storage usage information.

In one embodiment, the method may further include reassigning one of the plurality of tenants to another cluster based on the tenant usage for the cluster resource.

In one embodiment, the method may further include temporarily allocating cluster resources above the tenant resource commitment to a tenant.

In one embodiment, the method may further include assigning a new tenant to a cluster based on the cluster usage information. For example, a tenant may be assigned to a cluster that has fully-committed resources if the cluster usage information indicates that the resources are not used at the level of the commitment.

According to another embodiment, a system for optimizing cluster resource utilization may include a plurality of clusters in a multi-tenant environment, each cluster having cluster resources; a collection agent that collect resource information from each cluster; a database that stores resource information for each cluster; and a dashboard that presents the resource information. The dashboard may receive cluster usage information for at least one of the cluster resources; may determine tenant usage for the cluster resource for each of a plurality of tenants; may determine a tenant resource commitment for the cluster resource for each tenant; and may present tenant usage and tenant resource commitment for each resource.

In one embodiment, the dashboard may aggregate and store the tenant usage for the cluster resource in the database.

In one embodiment, the cluster resource may be one of memory, CPU, and storage.

In one embodiment, the cluster usage information may include Yarn queue utilization data.

In one embodiment, the tenant usage for the Yarn queue utilization data may be determined based on tenant mapping.

In one embodiment, the cluster usage information may include Impala pool usage information.

In one embodiment, the cluster usage information may include HDFS storage usage information.

In one embodiment, the dashboard may reassign one of the plurality of tenants to another cluster based on the tenant usage for the cluster resource In one embodiment, the dashboard may temporarily allocate cluster resources above the tenant resource commitment to a tenant.

In one embodiment, the dashboard may assign a new tenant to a cluster based on the cluster usage information. For example, a tenant may be assigned to a cluster that has fully-committed resources if the cluster usage information indicates that the resources are not used at the level of the commitment.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed here generally relate to systems and methods for optimizing cluster resource utilization. Embodiment disclosed herein may meter the tenants based on, for example, a characteristic of the workload as opposed to the infrastructure cost from a compute and storage model. This may improve resource utilization and may reduce the cost of operation while meeting the Service Level Agreements, or SLAs', of the workloads.

Embodiments may use a workload centric resource allocation model based on data characteristics, such as: (a) cold data/archive storage (e.g., data that is inactive and does not need to be queried frequently); (b) batch and interactive storage. In one embodiment, non-interactive workloads typically used in data warehousing use cases; and (c) stream processing memory (e.g., activity where end user, application, etc. interacts with the system regularly, such as generating a report or a query, real-time streaming, etc.).

In one embodiment, inactive data may be stored in a compressed state, and data uncompressing may be required before the data can be analyzed.

Embodiments may optimize the cluster resource utilization by, for example, co-locating big data workload types. By collocating workload types, storage and compute utilization ratios may be increased, which may optimize resources and metering based upon data workload characteristics.

In one embodiment, a funding model may be implemented for usage on demand and also for a level of granularity based on the workload profiles and their ramification on optimal hardware selection (e.g., extract-transfer-load (ETL), indexing, complex joins, machine learning, natural language processing, graph processing, etc.).

In one embodiment, a method for optimizing cluster resource utilization by co-locating big data workload types may include the receipt and/or identification of one or more workload characteristic. For example, the workload characteristic may be related to the state of the data, such as cold data/archive storage, batch and interactive storage, and stream processing memory.

In one embodiment, the data may be co-located with data having similar characteristic(s). For example, the data may be stored in the same datacenter, cloud storage, local memory, etc.

In one embodiment, the data may be accessed, and the processing of the data may be metered. In one embodiment, the cost associated with the processing may be based on the data characteristics, and not the resources required to process the data.

Figure 1:
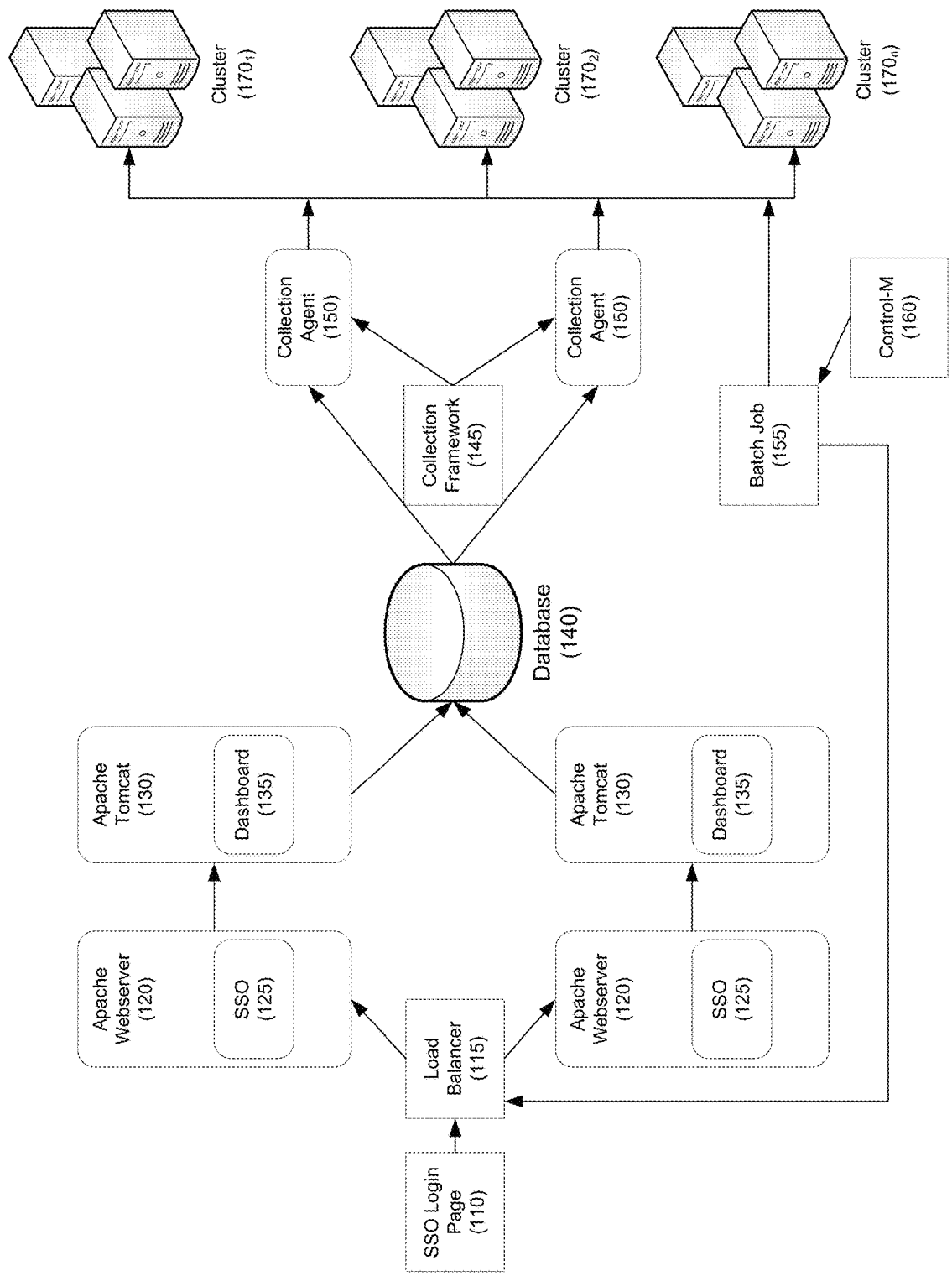
FIG. 1 depicts a system for optimizing cluster resource utilization according to one embodiment.

Referring to FIG. 1, a system for optimizing cluster resource utilization is disclosed according to one embodiment. System 100 may include SSO login page 110, which may enable a user (not shown) to log in to one or more systems with a single login. This may be used with single sign-on 125, which may be a Siteminder single sign-on. SSO 125 may enable user authentication and single sign-on.

System 100 may include load balancer 115, which may balance the load from one or more request to dashboard 135. Dashboard 135 may be a web application that displays the allocation and utilization information for cluster 170's resources. In one embodiment, dashboard 135 may further include a computer program or application that allocates resources to tenants, assigns tenants to clusters, etc.

System 100 may include webserver 120, such as Apache Webserver. This may be used to check the authenticity of the requests and forward it to application server 130. Application server 130 may be, for example, Apache Tomcat.

System 140 may include database 140, which may store data collected by, for example, collection agent 150.

Control-M 160 may schedule storage scripts that may parse, for example, the FsImage and post the data to database 140. Storage scripts may include a shell script and python script that collects storage and small files information and posts the details to database 140 through dashboard 135's REST call.

Batch job 155 may execute the scripts as scheduled or as necessary and/or desired. In one embodiment, batch job 155 may be a script that runs on each cluster, and may push the storage information of respective clusters by parsing FsImage. In one embodiment, batch job 155 may make a rest API call and may store the data in database 140.

High availably (HA) data collection framework 145 may be used to collect data from clusters $170_1 \ldots 170_n$. In one embodiment, high availably data collection framework 145 may be based on the Zookeeper framework.

Zookeeper 145 may be used as a HA solution for data collection framework.

Collection agent 150 may collect data from clusters $170_1 \ldots 170_n$. In one embodiment, collection agent 150 may be a standalone multi-threaded java application that collects yarn, impala, hosts, capacity details from each of cluster 170, checks configured thresholds and sends email notifications, and calculates yarn credits/debits for each day.

Figure 2:
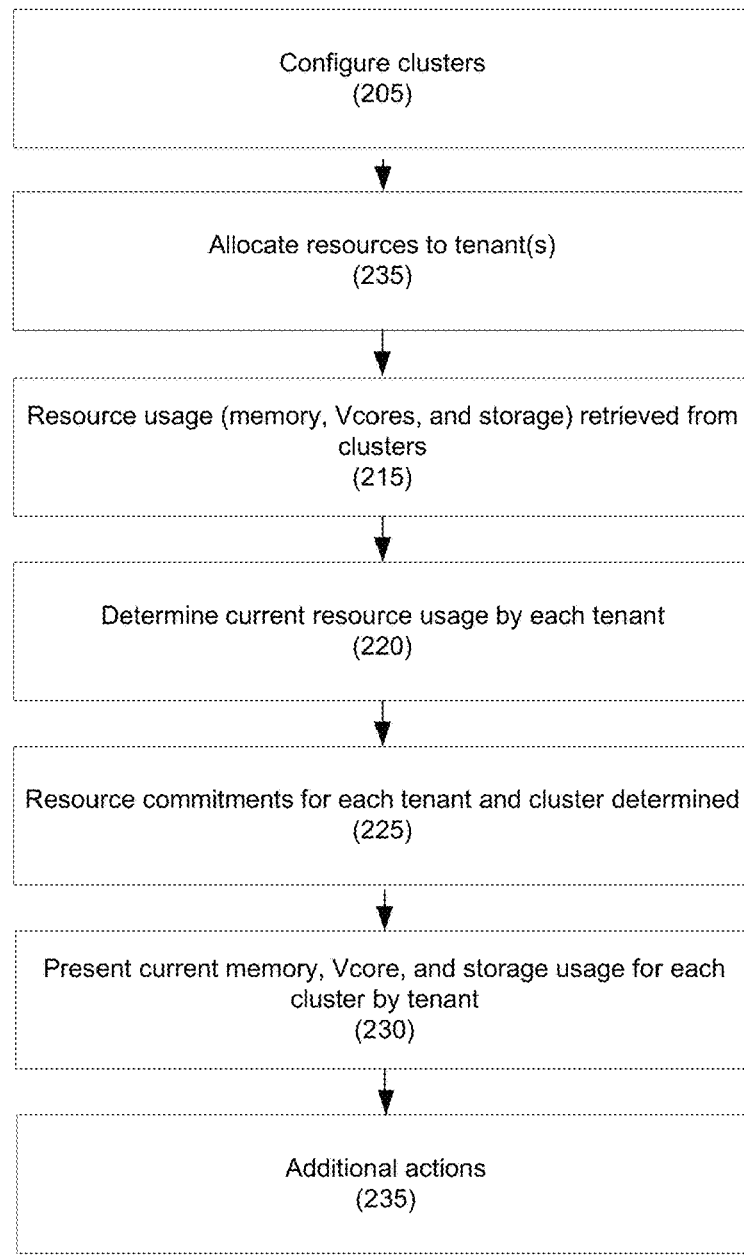
FIG. 2 depicts a method for optimizing cluster resource utilization according to one embodiment.

Referring to FIG. 2, a method for optimizing cluster resource utilization is disclosed according to one embodiment.

In step 205, a cluster may be configured. In one embodiment, each collection agent may be configured to communicate with the cluster(s). For example, the YARN Resource Manager Hostname and Port may be configured, the Cloudera Manager Hostname and Port may be configured, the HDFS Namenode hostname and port may be configured. The necessary credentials needed to communicate with these systems may also be configured.

In one embodiment, the resources that belong to, associated with, or are assigned to, each tenant may be specified. For example, the names of YARN queues, the Impala Resource pools, HDFS directories, Hive databases, HBase Namespaces, etc. for each tenant may be identified, the. In one embodiment, all cluster resources may be identified and configured against a tenant. This tenant information assists the collection agent in associating the utilization information received from YARN, HDFS, and Impala to the tenant(s).

In step 210, resources may be allocated to tenants according to, for example, a service level agreement (SLA). Examples of Resource management system configuration are disclosed in U.S. patent application Ser. No. 15/860,021, the disclosure of which is hereby incorporated, by reference, in its entirety.

In step 215, resource usage (e.g., memory, Vcores (e.g., CPU usage), and storage) for each cluster may be retrieved.

In one embodiment, Yarn queue information, Impala pool information, and HDFS storage information may be retrieved. In one embodiment, data collection agents may collect the resource usage information. Examples of collection methods are disclosed in FIGS. 3 (Yarn), 4, (Impala) and 5 (HDFS).

In one embodiment, the resource usage may be stored in a database, such as HBase.

In step 220, the current memory, Vcores, and storage usage for each tenant may be determined from the retrieved resource usage. In one embodiment, for resource usage information that is not tenant-specific, such as Yarn queue information, mapping determined during cluster and/or tenant configuration, such as mapping Yarn queues to tenants, may be used.

In one embodiment, the resource usage may be associated with a timestamp and may be stored in a database, such as Hbase.

In step 225, resource commitments for the cluster resources may be determined. In one embodiment, the commitments may be based on a service level agreement (SLA) that specifies the amount of each resource that each tenant may be allocated. In one embodiment, the resources may be allocated by creating YARN queues, Impala pools, and by allocating storage using quotas. Examples of resource allocation are disclosed in U.S. patent application Ser. No. 15/860,021, the disclosure of which is hereby incorporated, by reference, in its entirety.

In step 230, the current resource usage for each cluster and/or tenant may be presented. In one embodiment, past usage may be presented for a certain time, a time period, etc. In one embodiment, the resource commitment for each cluster and/or tenant may be provided.

Exemplary screenshots are provided as FIGS. 10A-10I.

Figure 10A:
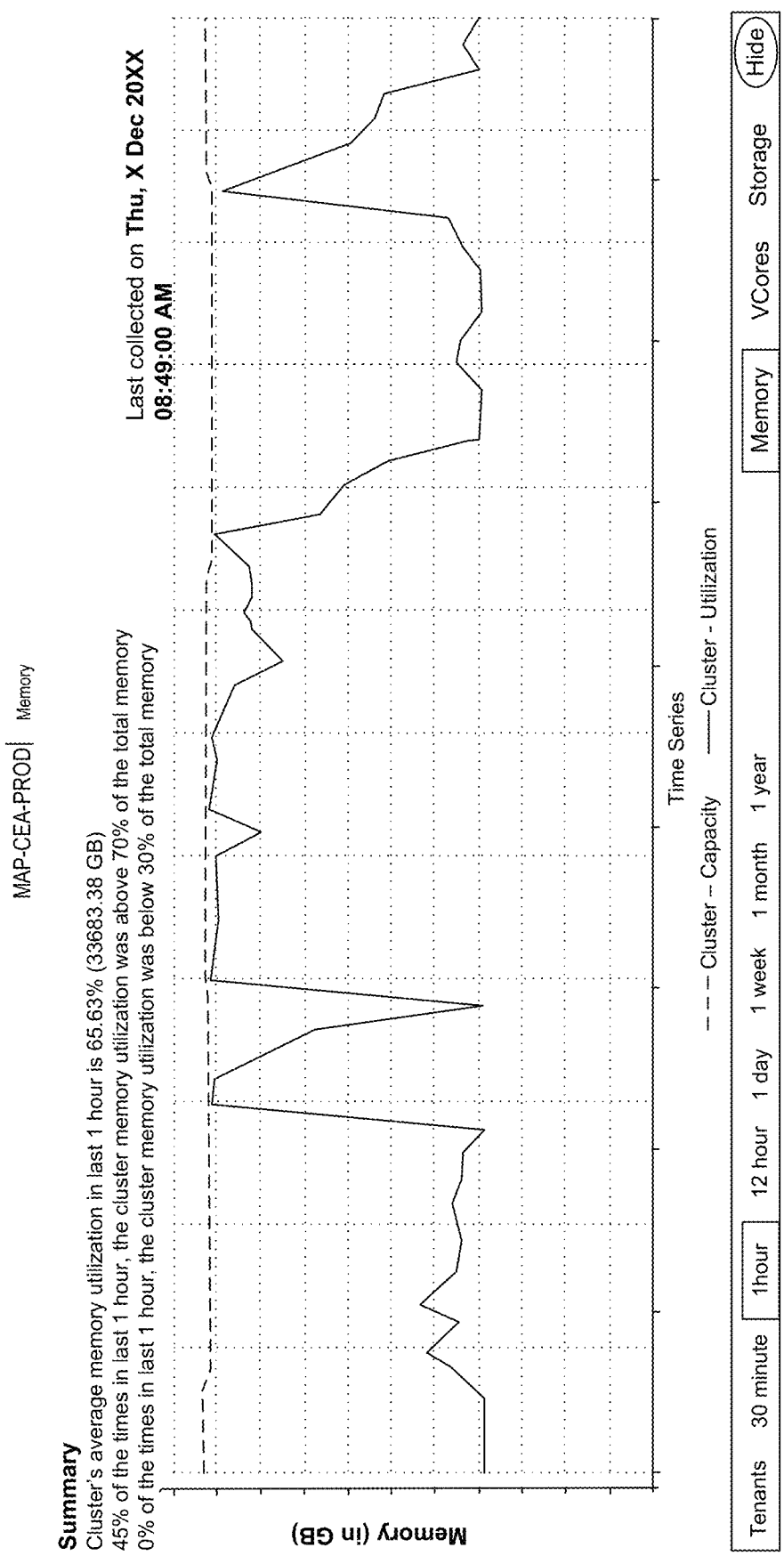
FIGS. 10A-10I depict exemplary screenshots according to embodiments.
Figure 10B:
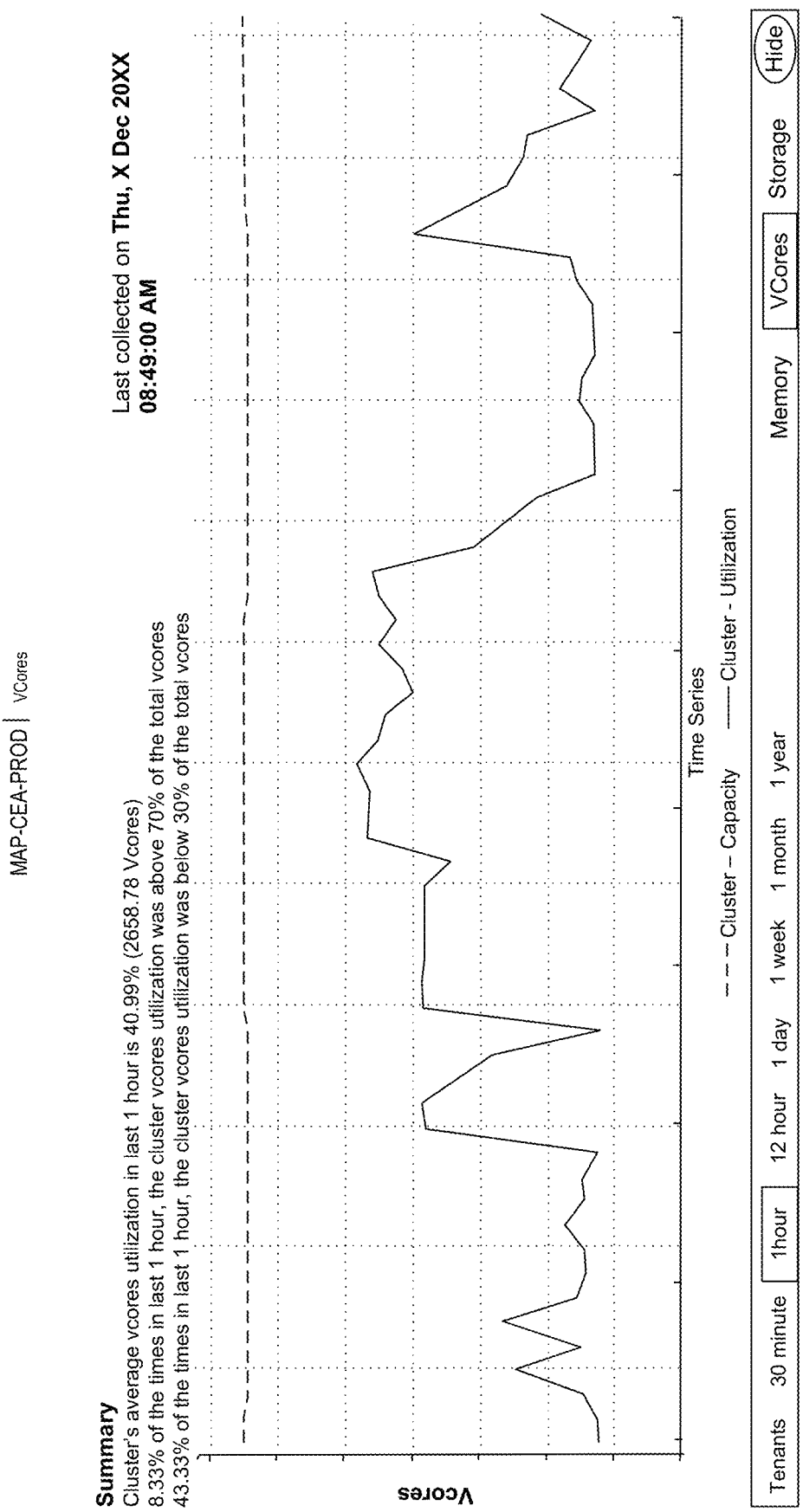

FIG. 10A is an exemplary depiction of a plot of memory utilization versus capacity for Yarn at a cluster level. FIG. 10B is an exemplary diction of Vcore utilization versus capacity for Yarn at a cluster level.

Figure 10C:
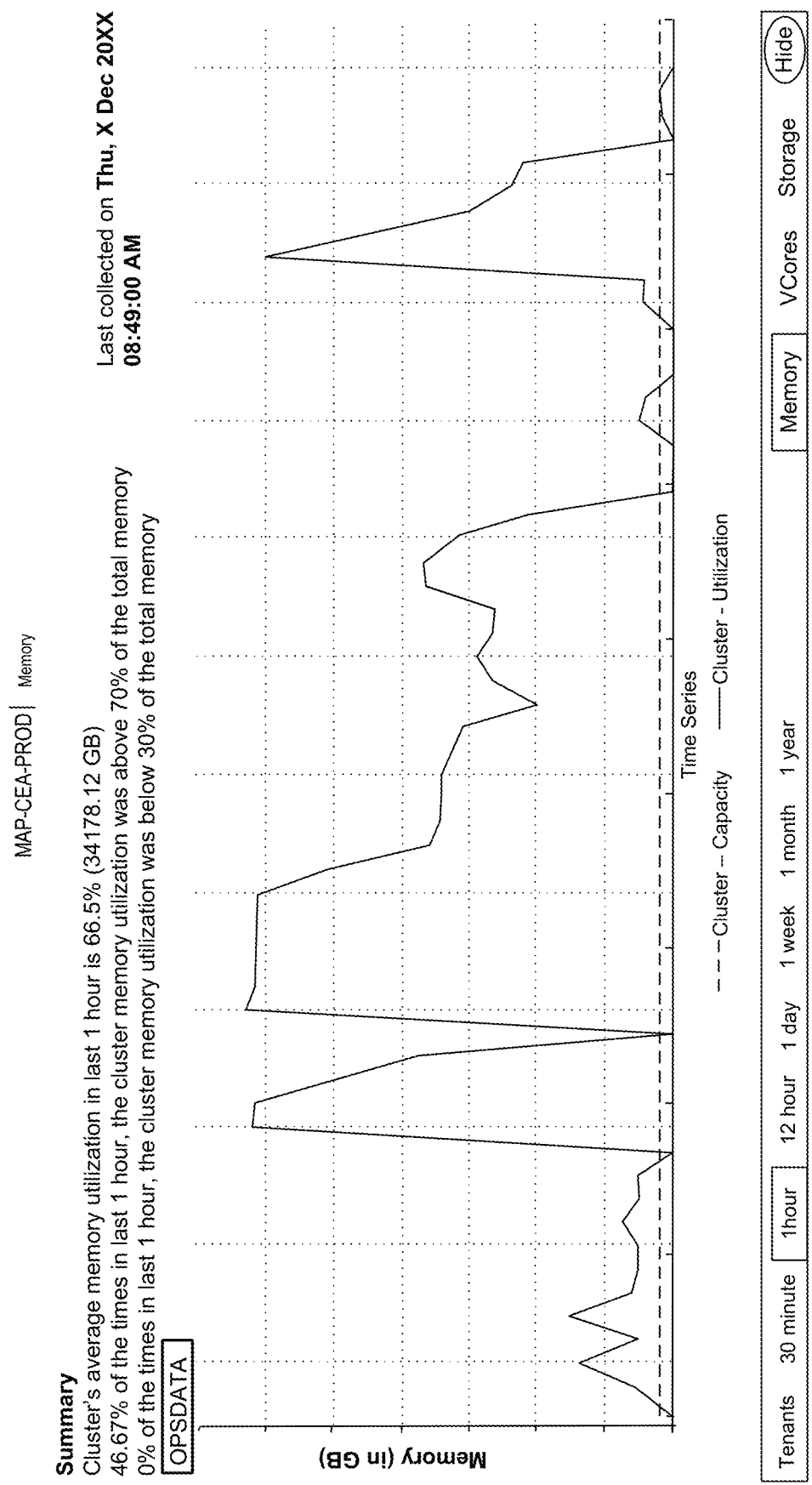

FIG. 10C is an exemplary depiction of memory utilization versus capacity for Yarn for a specific tenant. Note that this depiction illustrates that the tenant is able to burst beyond its allocation.

Figure 10D:
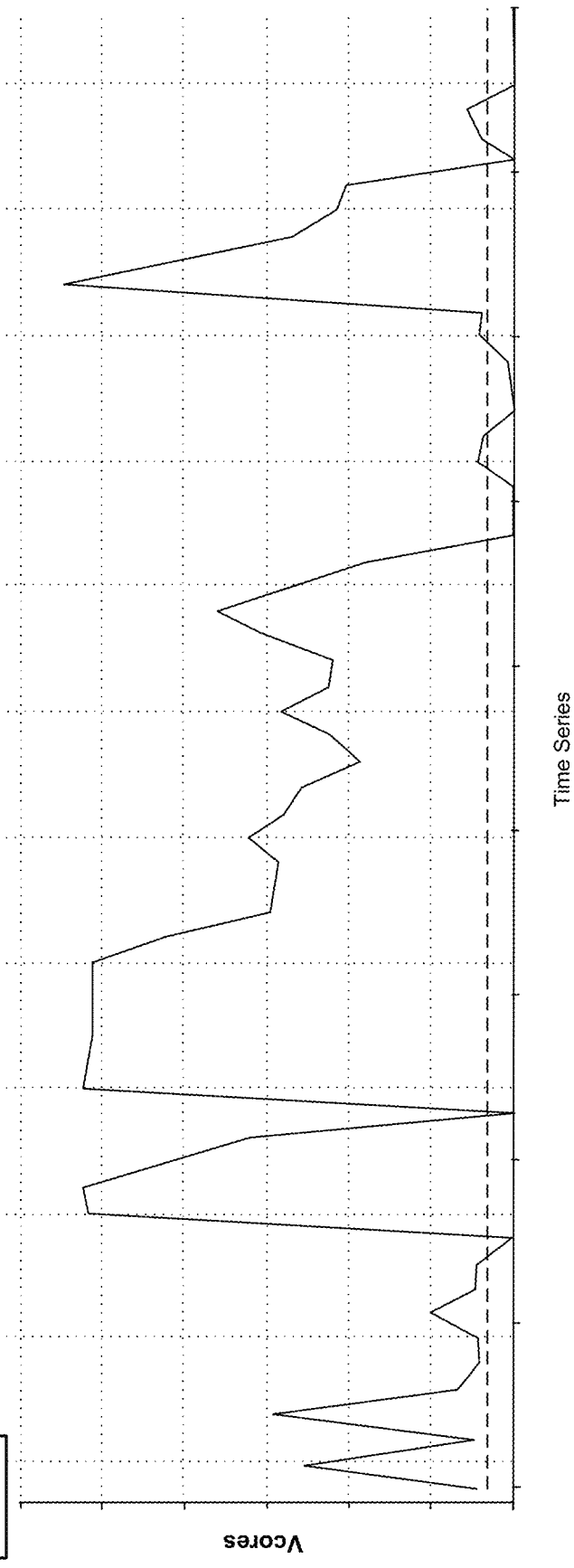

FIG. 10D is an exemplary depiction of Vcore utilization versus capacity for Yarn for a specific tenant. Note that this depiction illustrates that the tenant is able to burst beyond its allocation.

Figure 10E:
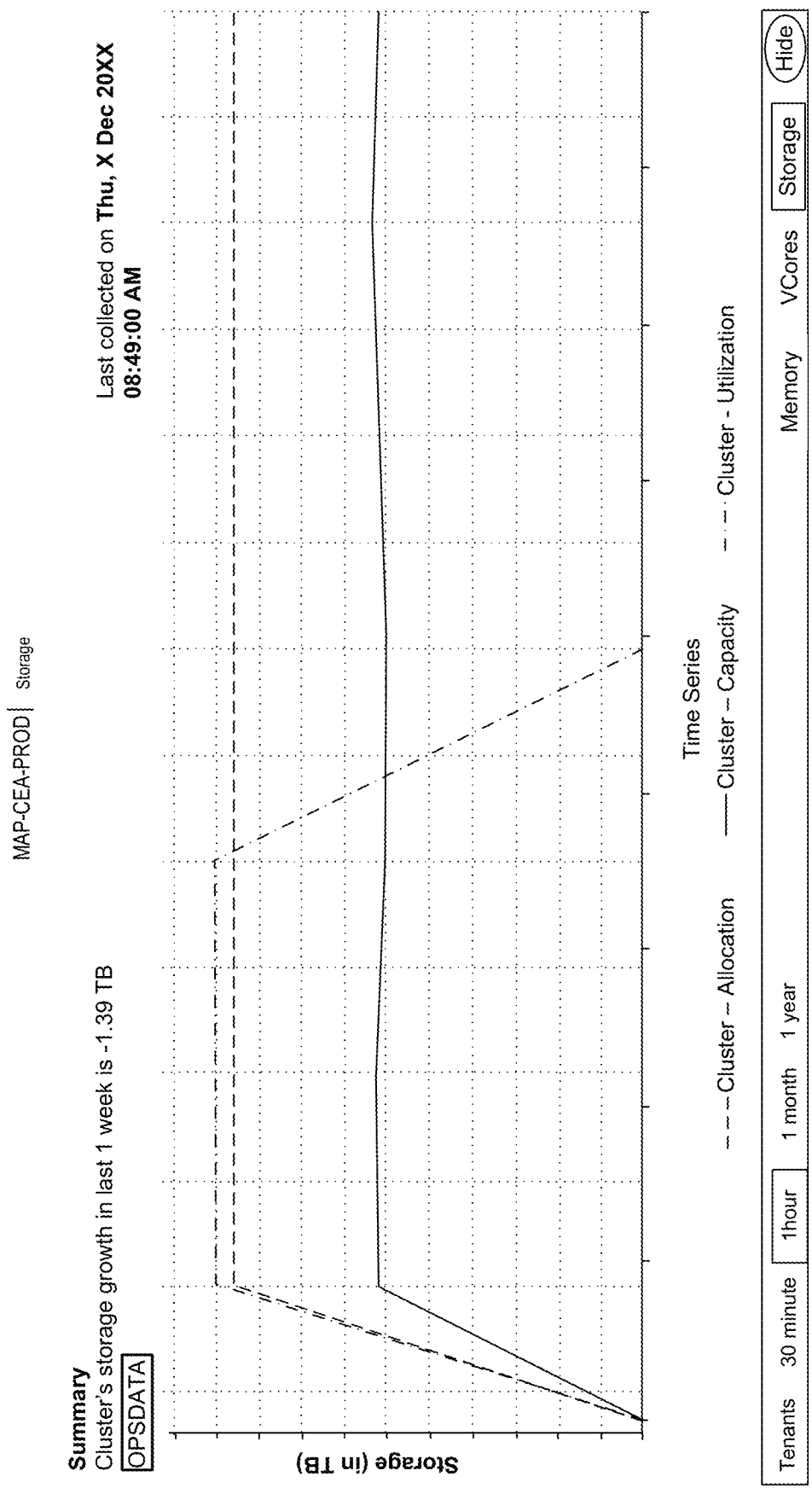

FIG. 10E is an exemplary depiction of storage capacity versus allocation versus utilization.

Figure 10F:
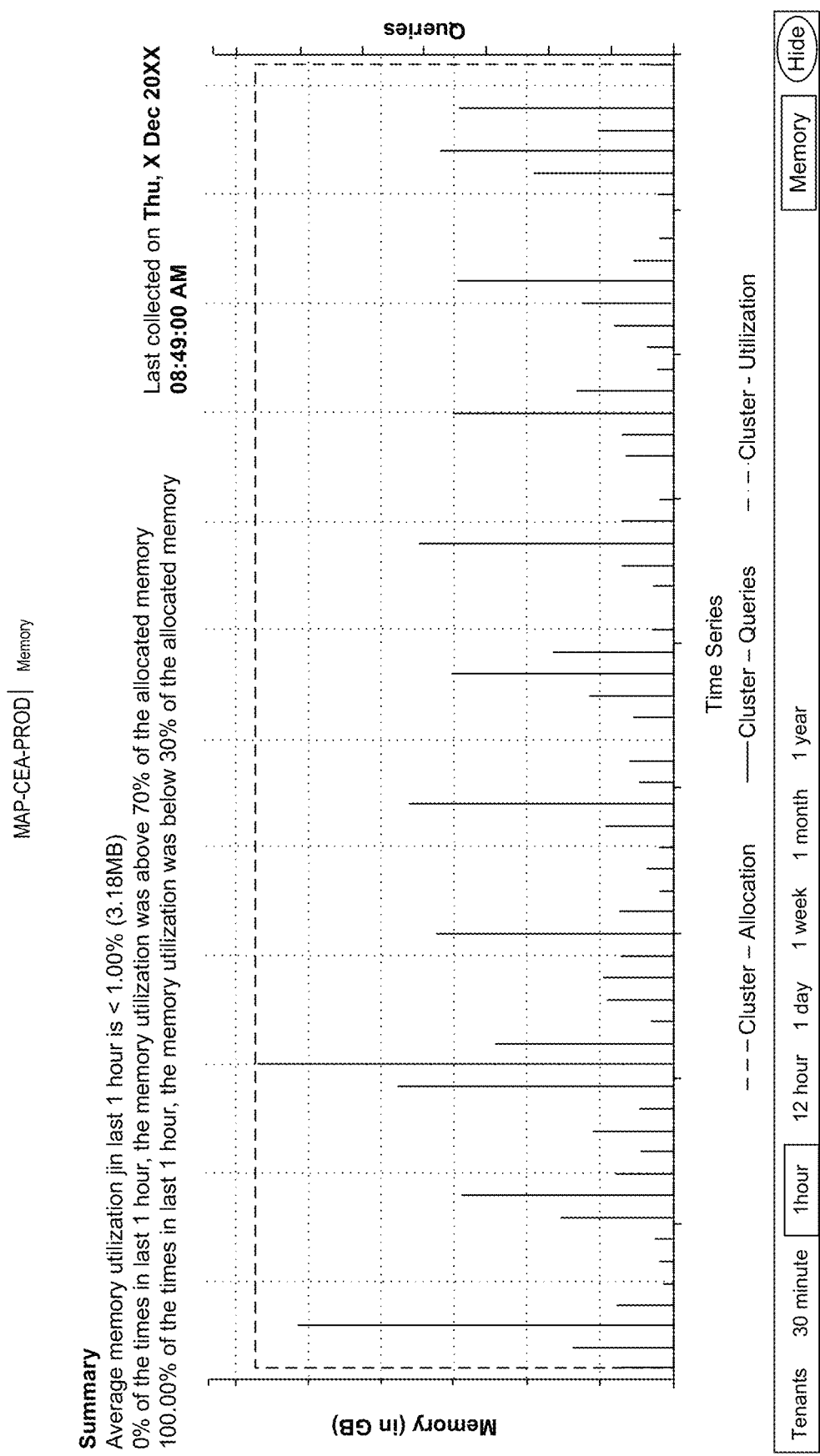

FIG. 10F is an exemplary depiction of Impala capacity versus utilization at the cluster level. A similar depiction may be made for an individual tenant.

Figure 10G:
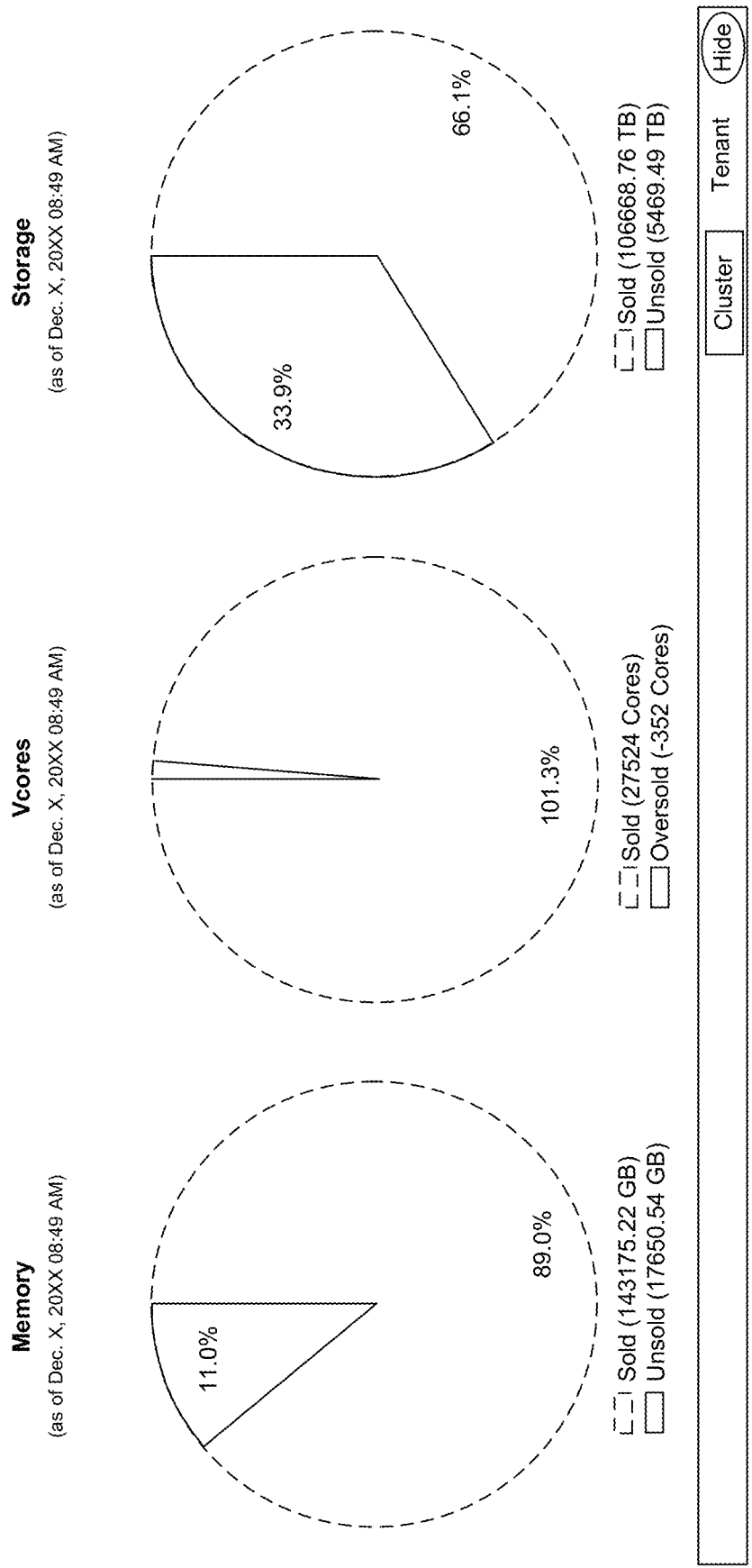

FIG. 10G is an exemplary depiction of a demand management screen at the cluster level. This illustrates the capacity that exists and what is committed (e.g., sold or allocated) to tenants. This may be used to determine where to assign new tenants.

Figure 10H:
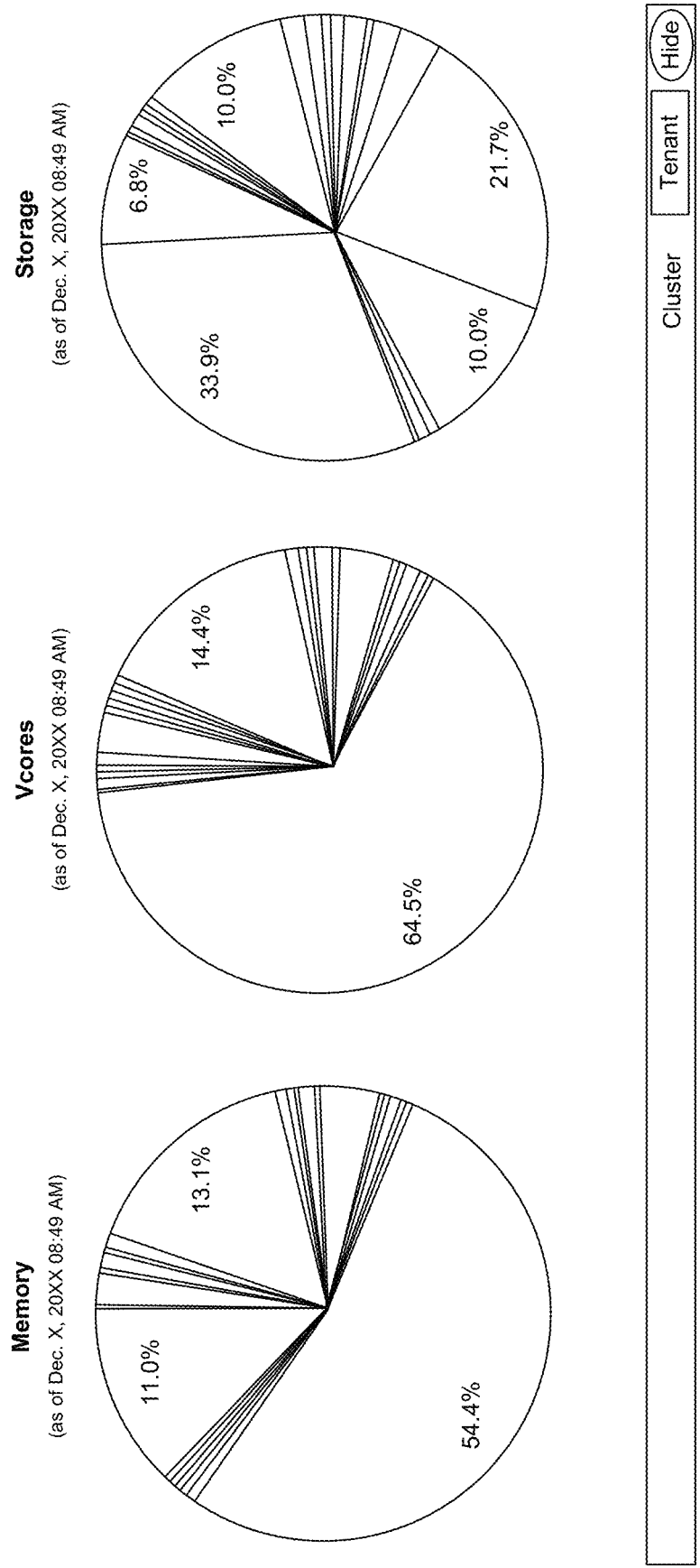

FIG. 10H is an exemplary depiction of a demand management screen at the tenant level. This illustrates the capacity that exists, and what is committed (e.g., sold or allocated) to tenants. FIG. 10H depicts the demand management screen of FIG. 10G broken down by tenant.

Figure 10I:
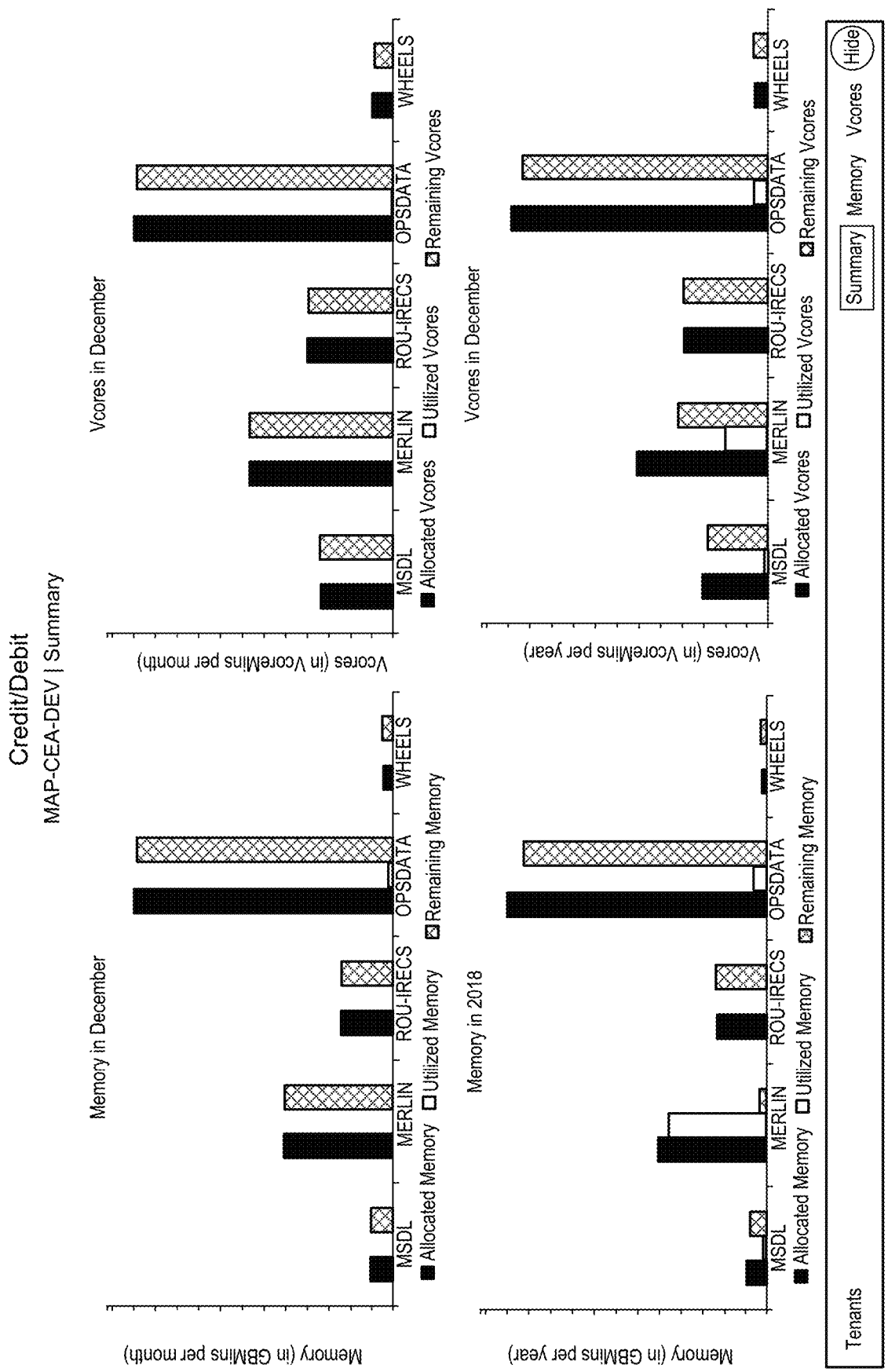

FIG. 10I is an exemplary depiction of credits and debits calculated for tenants. This is in the context of month to date and year to date for both memory and Vcores.

In one embodiment, as resource usage is updated, the presentation of the resource usage may be updated.

In step 235, additional actions may be taken. For example, tenants may be re-allocated to clusters based on their workload type. For example, tenants with archive workloads may be assigned to one cluster, while tenants with batch/interactive workloads may be assigned to another, and tenants with streaming workloads may be assigned to another.

In one embodiment, the tenant's cluster resource usage may be metered, for example, based on the tenant's workload type.

In another embodiment, a funding model may be implemented based on the tenant's cluster resource usage, and the tenant's workload type.

In another embodiment, cluster resources above the tenant resource commitment to a tenant may be allocated based on the cluster resource usage. For example, a tenant may "burst" into another tenant's committed, but unused, resources.

For example, a cluster may be assigned to a cluster that has fully-committed resources if the cluster usage information indicates that the resources are not used at the level of the commitment.

In one embodiment, portfolio management heuristics may be used to provide the following: bursting, which benefits from added resources when a tenant burst into another tenant's unused resources in order to utilize more Vcores and memory from others; pre-emption, which is enabled to regain the control of the allocated resources for a tenant by releasing the resources that are "overused" by other tenants (during that period, bursting may be disabled in this tenant which usually requires more than allocated/committed resources for a sustained period of time. The minimum and maximum allocation may be set as the same value so that others do not interfere in this tenant's processing); user management including efficient scheduling, enforcement of tool/workbench (e.g., Jupyter) session best-practices, killing of all abandoned jobs, etc.; and incremental addition of assets after budget approval for hardware.

In one embodiment, portfolio optimization heuristics may be used to perform advanced Hadoop fine tuning. For example, resources may be balanced among Impala, Yarn, core services (HDFS, HBase, etc.) and unused reserves to yield maximum efficiency of the hardware).

Portfolio optimization heuristics may also be used to provide weight-based Yarn. For example, the allocation of resources per tenant may be managed by assignment of a percentage of the total available as opposed to current practice of assigning specific memory and Vcore minimums committed as per the SLAs. Imputed benefits are better "fair-scheduling" between jobs and potentially optimal fine-tuning mechanism.

Depending on the type of jobs being run, the cluster configuration properties in Cloudera Manager may need to be changed to optimize resource utilization for better performance. For example, mapreduce.job.counters.max may be changed to limit the number of counters that a job can have, to avoid "Out of Memory" exceptions.

In one embodiment, portfolio optimization heuristics may be used to manage jobs. For example, embodiments may perform application query tuning, such as deciding static versus dynamic queries, optimal number of job executors, etc.

In one embodiment, portfolio optimization heuristics may be used to reallocate tenants. This may free unused resources from other tenants. For example, achieve data may be moved from HDFS to Neptune storage.

In one embodiment, the top recommendations obtained using management and optimization heuristics may increase the flexibility of the decision makers to minimize the risk and maximize the return based on near real-time monitoring on the performance of cluster resources. In one embodiment, actions taken based on the management and optimization heuristics may be automated.

In step 240, the cluster portfolio may be forecast. For example, processing of the utilization data may provide visibility on the current utilization, and may be used to predict data growth in terms of memory, Vcore and storage capacity. In one embodiment, growth may be anticipated based on historic data and a plan for expansion of the infrastructure.

Figure 3:
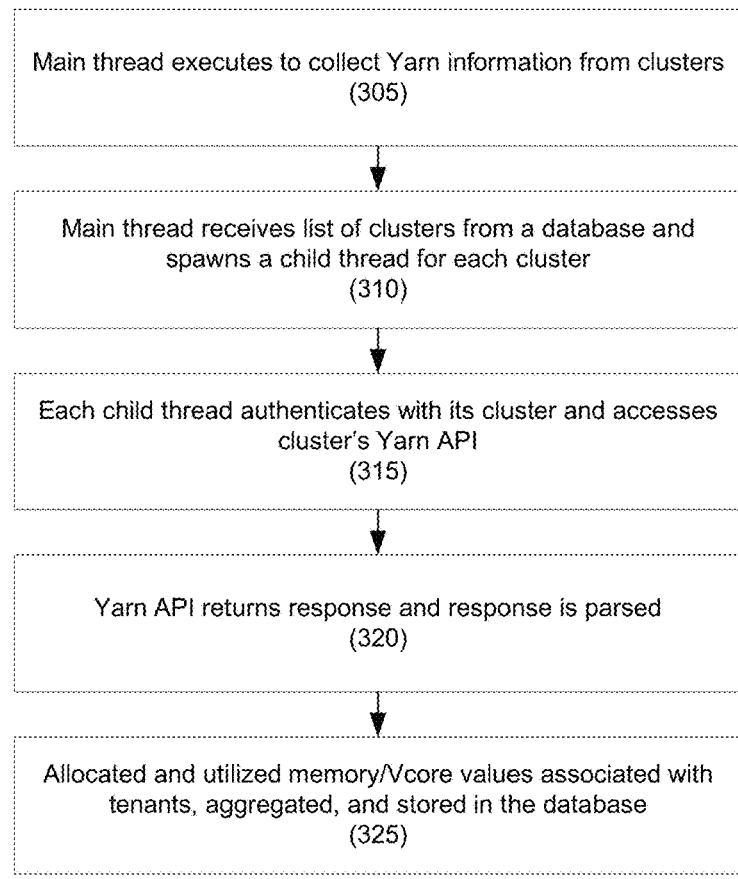
FIG. 3 depicts a method for Yarn queue utilization data collection according to one embodiment.

Referring to FIG. 3, a method for data collection is disclosed according to one embodiment. In one embodiment, the data collected may be Yarn utilization data, such as the Yarn queue information for each cluster.

In step 305, a main thread may be executed to collect Yarn information from all the clusters. In one embodiment, the main thread may be scheduled, and may be run periodically (e.g., once a minute). In another embodiment, the main thread may be run on demand.

In step 310, the main thread may receive the list of clusters from a database (e.g., HBase) and may spawn a new child thread for each cluster to collect its Yarn information (e.g., Yarn queue information).

In step 315, each child thread may authenticate with its cluster (e.g., using a Kerberos authentication with a keytab configured for the cluster) and may then access the cluster's Yarn API. For example, the child thread may use the resource manager url appended with /ws/v1/cluster/scheduler.

In step 320, the Yarn API may return a response and the response may be parsed to fetch each Yarn queue's minimum and used resources (e.g., memory and Vcores). The minimum resources may be considered to be the allocated memory (in mb) and Vcores values. The used resources may be considered to be the utilized memory (in mb) and Vcores for that period of time (e.g., a rounded minute).

In step 325, the allocated and utilized memory and Vcore values of all the Yarn queues associated with one of the tenants, or for each tenant, are aggregated and stored in the database (e.g., HBase) for the current period of time (e.g., the rounded minute).

Figure 4:
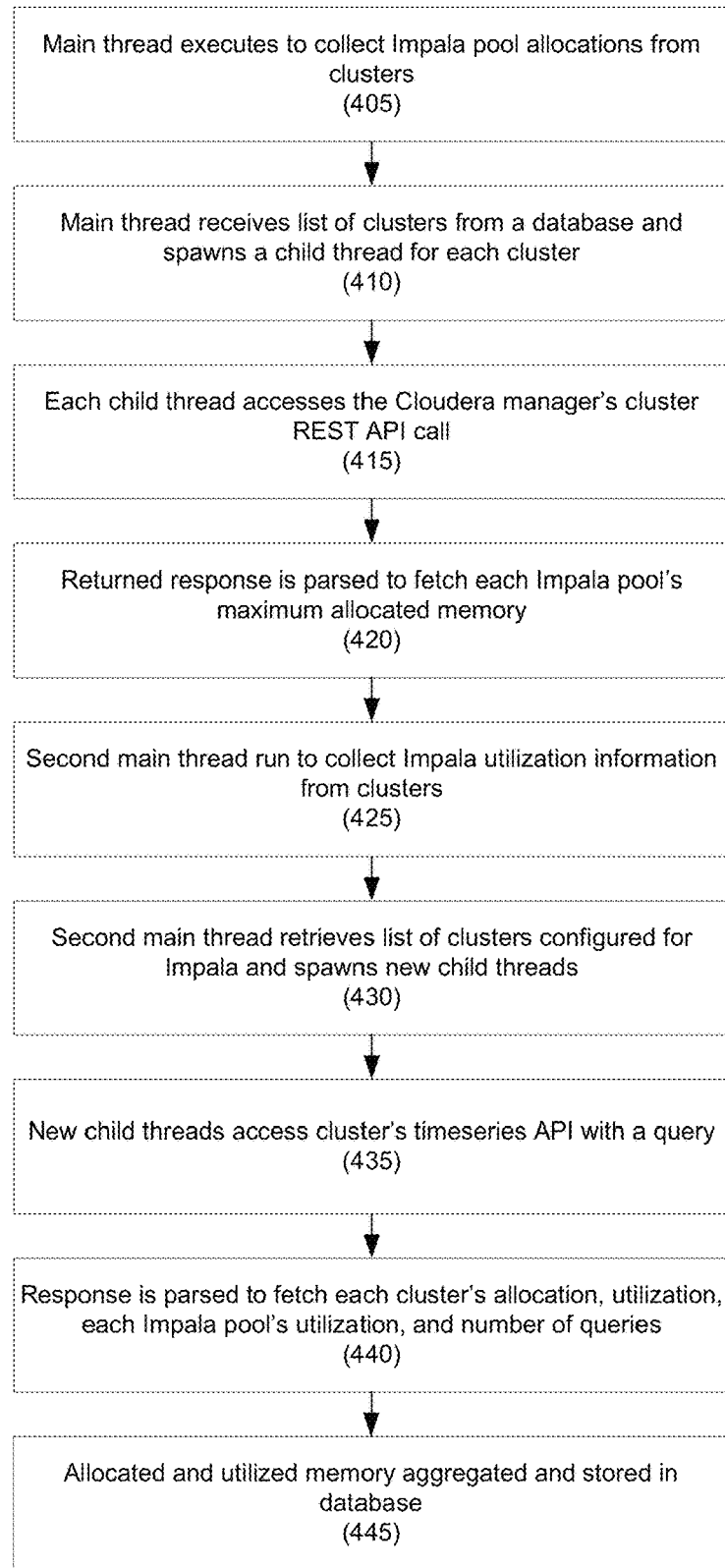
FIG. 4 depicts a method for Impala pool utilization data collection according to one embodiment.

Referring to FIG. 4, a method for data collection is disclosed according to one embodiment. In one embodiment, the data collected may be Impala utilization data.

In step 405, a main thread may be executed to collect Impala pool allocations from all the clusters. In one embodiment, the main thread may be scheduled, and may be run periodically (e.g., once a day). In another embodiment, the main thread may be run on demand.

In step 410, the main thread may retrieve the list of clusters configured for Impala from a database (e.g., HBase) and may spawn a new child thread for each cluster to collect all the Impala pools allocations.

In step 415, each child thread may access, for example, the Cloudera manager's cluster REST API call.

In step 420, the returned response may be parsed to fetch each Impala pool's maximum allocated memory, which may then be stored against each tenant in the database (e.g., HBase).

In step 425, a second main thread may run periodically or as desired to collect Impala utilization information from all the clusters. In one embodiment, the thread may be scheduled to run every five minutes.

In step 430, the second main thread may retrieve the list of clusters configured for Impala from the database (e.g., HBase), as well as the allocated memory for each tenant from the database (e.g., saved to the database once a day by calling Impala config API) and then spawns a new child thread for each cluster to collect its Impala utilization information.

In step 435, each new child thread may access the cluster's timeseries API for a specific time minute range.

In step 440, the response returned by the timeseries API may be parsed to fetch each cluster's allocation, cluster's utilization and each Impala pool's utilization and number of queries, across all the clusters.

In step 445, the allocated and utilized memory of all the Impala pools associated with the respective tenant are aggregated and stored in the database (e.g., HBase). For example, the allocated and utilized memory of all the Impala pools associated with the respective tenant may be stored against each minute in the 5 minute range.

Figure 5:
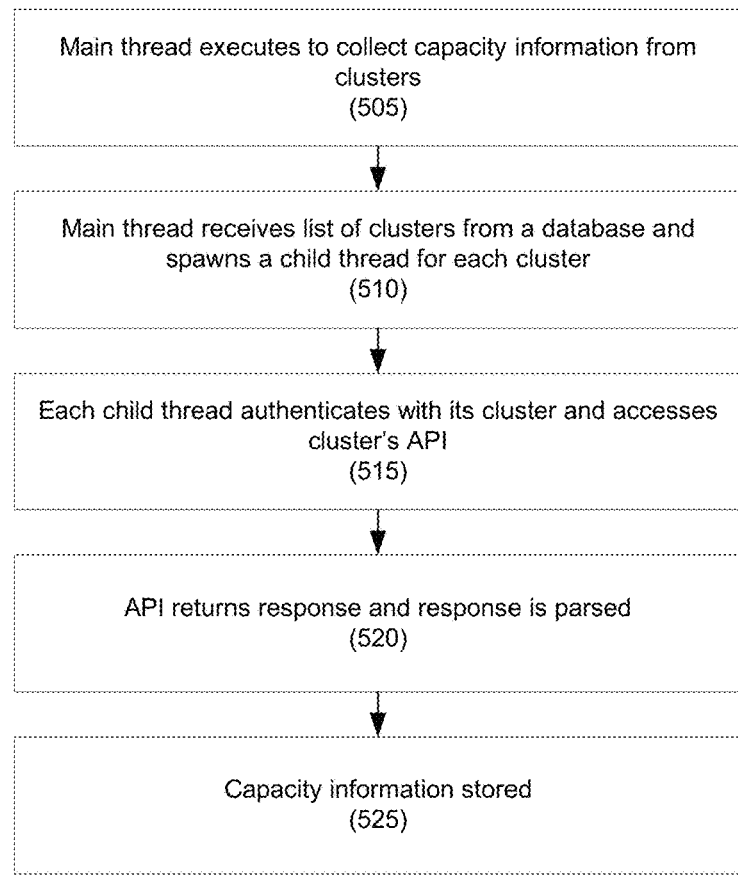
FIG. 5 depicts a method for determining a total cluster capacity according to one embodiment.

Referring to FIG. 5, a method for determining a total cluster capacity is disclosed according to one embodiment.

In step 505, a main thread may be executed to collect capacity information from all the clusters. In one embodiment, the main thread may be scheduled, and may be run periodically (e.g., once a day). In another embodiment, the main thread may be run on demand.

In step 510, the main thread may retrieve the list of clusters configured for Impala from a database (e.g., HBase) and may spawn a new child thread for each cluster to collect its capacity information In step 515, each child thread may authenticate with its cluster (e.g., using a Kerberos authentication with a keytab configured for the cluster) and may then access the cluster's API provided by HDFS Namenode, YARN RM.

In step 520, the response returned by the API may be parsed to provide the following information: CapacityTotalGB; CapacityUsedGB; CapacityUsedNonDfs; and CapacityRemainingGB.

In step 525, the capacity information for each cluster is then stored in HBase against the cluster name.

Figure 6:
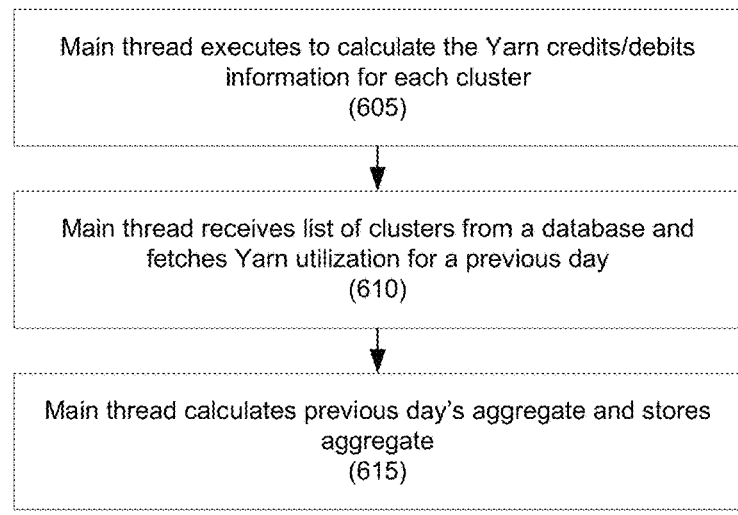
FIG. 6 depicts a method for calculating the Yarn credits/debits information according to one embodiment.

Referring to FIG. 6, a method for calculating Yarn credits/debits information for each cluster is disclosed according to one embodiment. "Credits" may refer to the committed resources, and "debits" may refer to the currently-used resources. For example, the collected Yarn utilization data may be used to compute the debits and credits for each tenant.

In step 605, a main thread may be executed to calculate the Yarn credits/debits information for each cluster by getting the data from a database (e.g., HBase). In one embodiment, the main thread may be scheduled, and may be run periodically (e.g., once a day). In another embodiment, the main thread may be run on demand.

In step 610, the main thread may retrieve the list of clusters from the database (e.g., HBase) and may fetch the Yarn utilization, for example, for a previous day for each tenant in the cluster.

In step 615, the main thread may calculate the previous day's aggregate (e.g., in terms of memory minutes, Vcore minutes) for each tenant and cluster, and may insert them into the database against the previous day's timestamp. Other aggregation timings (e.g., by hour) may be used as is necessary and/or desired.

Figure 7:
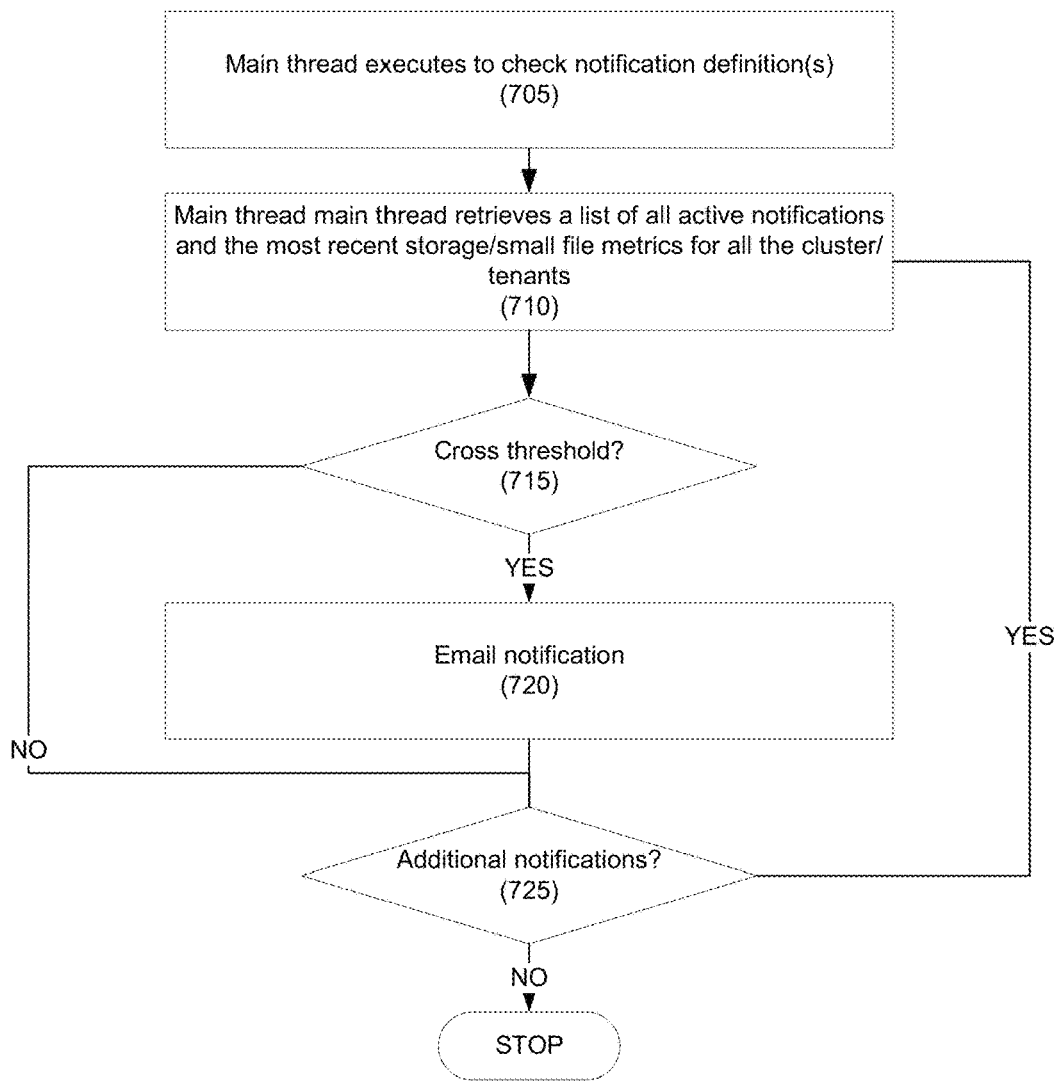
FIG. 7 depicts a method for checking notification definitions according to one embodiment.

Referring to FIG. 7, a method for checking notification definitions is disclosed according to one embodiment. For example, the collected Yarn utilization data may be used to generate notifications when certain thresholds are met, and may send notifications by, for example, email. In one embodiment, notifications may be displayed in an application, dashboard, etc.

In step 705, a main thread may be executed to check the notification definitions (storage and small files) and email if any of them crossed a set threshold. In one embodiment, the main thread may be scheduled, and may be run periodically (e.g., once a day at 4 am). In another embodiment, the main thread may be run on demand.

In step 710, the main thread may retrieve a list of all active notifications and the most recent storage/small file metrics for all the cluster/tenants.

In step 715, the main thread may check the notification definition against the most recent storage/small file information, and may check to see if the most recent value crossed the threshold set in the definition.

If the most recent value for storage/small file for that cluster/tenant crosses the set threshold, in step 720, the main thread will then email to the address (e.g., email, SMS, etc.) defined in the notification.

If, in step 725, additional notifications exist, the process is repeated.

Figure 8:
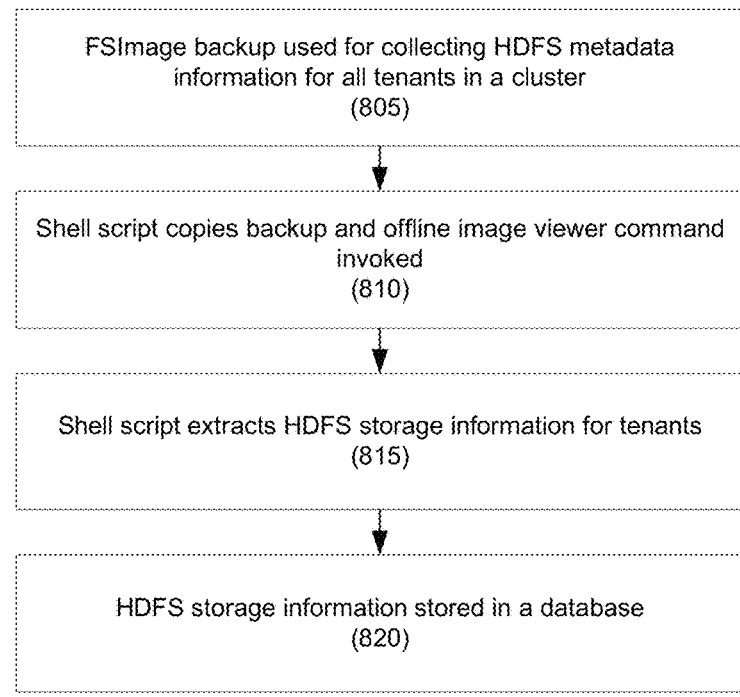
FIG. 8 depicts a method for determining HDFS storage information in the clusters according to one embodiment.

Referring to FIG. 8, a method for determining HDFS storage information in the clusters is disclosed according to one embodiment. In one embodiment, the method may provide utilization information from a storage perspective.

In step 805, a FsImage backup on namenode may be used for collecting HDFS metadata information for all the tenants in a cluster.

In step 810, a shell script may be invoked to copy the backed up FsImage on the namenode to a temporary location, where a zip file is extracted and a 'hdfs oiv' (offline image viewer) command is invoked on the FsImage to generate a text file.

In step 815, the shell script may then invoke python script to parse the text file for extracting HDFS storage information of all the tenants and also the small files (<=1 IB), total directory count, and total file count information tenant-wise, user-wise, and top-level-directories-wise.

In step 820, the information may then be posted, for example, as a JSON, over HTTPS to the dashboard, which may deserialize and stores the information in HBase.

Figure 9:
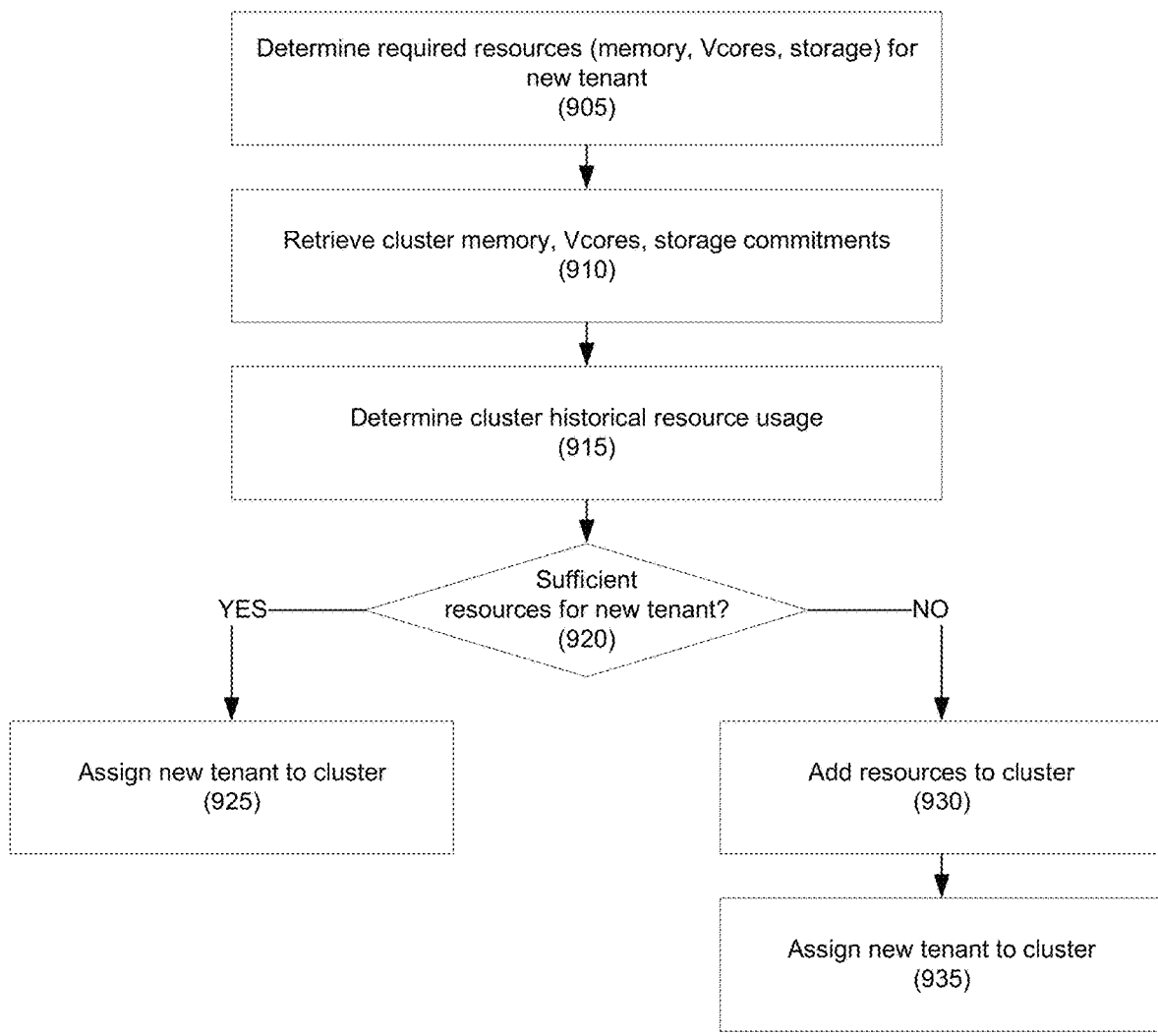
FIG. 9 depicts a method for onboarding a new tenant according to one embodiment.

Referring to FIG. 9, a method for new tenant onboarding is disclosed according to one embodiment.

In step 905, resource requirements (e.g., memory, Vcores, storage) for a new tenant may be determined. In one embodiment, the new tenant's resource requirements may be based on the tenant's workload type, such a batch, streaming, or archive, and the size of the datasets. Based on these factors, ratios may be used to appropriately size the tenants, and determine the resource requirements for the tenant.

In step 910, the memory, Vcore, and storage commitments for one or more cluster may be retrieved. This may be similar to step 220, above.

In step 915, historical resource usage for the cluster(s) may be determined. In one embodiment, the historical resource usage may be retrieved from a database (e.g., Hbase). In one embodiment, if the historical cluster resource usage is lower than the committed resource commitments, the cluster may be over 100% committed.

In one embodiment, the historical resource usage may be retrieved for a certain period of time (e.g., prior month), etc. In one embodiment, an average and maximum historical usage may be determined.

In step 920, a check is made to see if the cluster(s) have sufficient resources available, either based on resource commitments or based on historical resource cluster usage.

In one embodiment, a tenant may be assigned to a cluster that has fully-committed resources if the cluster usage information indicates that the resources are not used at the level of the commitment.

If sufficient resources are available, in step 925, the new tenant may be assigned to the cluster, and the committed resources for the cluster may be updated.

If sufficient resources are not available, in step 930, additional resources may be added to one or more cluster, and in step 935, the new tenant may be assigned to the cluster. The committed resources for the cluster may also be updated.

The disclosures of U.S. patent application Ser. No. 15/602,339 and 62/340,284 are hereby incorporated, by reference, in their entireties.

The following exemplary calculations are provided.

Yarn/Impala Utilization Calculations

For time periods less than or equal to a day, utilization data may be collected every minute and may be reported as is (e.g., for time periods of 30 mins, 60 mins, 12 hours, and 1 day)

When there are more data points than can be shown on the graph, then the data points may be reduced to fit on the graph. So at each data point, two aggregate metrics may be shown—the average utilization and max utilization instead of the absolute utilization.

The data points may be reduced using the edge gap formula, which is based on the time difference in minutes between two adjacent data points. In one embodiment, it may be calculated with the following exemplary code:

```
public static int getEdgeGap(long startTime, long endTime) {
    int totalDataPoints = getTotalDataPoints( );
    int edgeGap = 1;
    long diffInMinutes = getTimeDiffinMinutes(startTime, endTime);
    if(diffInMinutes == 0) {
        edgeGap = 0;
    } else if(diffInMinutes <= 1440) { // 1 Hour or 12 Hours or 1 Day
        edgeGap = 1;
    } else if(diffInMinutes > 1440 && diffInMinutes < 10080) { // More
        than 1 Day and less than 1 Week
        edgeGap = (int)(diffInMinutes / totalDataPoints) + ((diffInMinutes %
        totalDataPoints) == 0 ? 0 : 1);
    } else if(diffInMinutes == 10080) { // 1 Week
        edgeGap = 7;
    } else if(diffInMinutes > 10080 && diffInMinutes < 40320) { // More
        than 1 Week and less than 1 month
        edgeGap = (int)(diffInMinutes / totalDataPoints) + ((diffInMinutes %
        totalDataPoints) == 0 ? 0 : 1);
    } else if(diffInMinutes == 40320) { // 1 Month - 28 days
        edgeGap = 28;
    } else if(diffInMinutes > 40320 && diffInMinutes <= 41760) // 1
        Month - 29 days
        edgeGap = 29;
    } else if(diffInMinutes > 41760 && diffInMinutes <= 43200) { // 1
        Month - 30 days
        edgeGap = 30;
    } else if(diffInMinutes > 43200 && diffInMinutes <= 44640) { // 1
        Month - 31 days
        edgeGap = 31;
    } else if(diffInMinutes > 44640 && diffInMinutes < 525600) {
        edgeGap = (int)(diffInMinutes / totalDataPoints) + ((diffInMinutes %
        totalDataPoints) == 0 ? 0 : 1);
    } else if(diffInMinutes == 525600) { // 1 Year - 365 days
        edgeGap = 365;
    } else if(diffInMinutes == 527040) { // 1 Year - 366 days
        edgeGap = 366;
    } else {
        edgeGap = (int)(diffInMinutes / totalDataPoints) + ((diffInMinutes %
        totalDataPoints) == 0 ? 0 : 1);
    }
    return edgeGap;
}
```

Average Utilization

The Average Utilization at a data point is the average of all the utilizations between the current data point and the previous data point. For example, average utilization may be calculated as follows:

$$A=(U1+U2+\ldots Un)/\text{EDGE\_GAP}$$

Where:

A is the average utilization at a given data point;

U1, U2 up to Un are the utilizations at each minute between U1 and Un, and U1 and Un are adjacent data points on the graph; and EDGE_GAP is the time difference in minutes between two adjacent data points.

Max Utilization

The Max Utilization at a data point is the maximum of all the utilizations between the current data point and the previous data point. It may be calculated as follows:

$$M=\text{Maximum of }(U1,U2,\ldots Un)$$

Where

M is the max utilization at a given data point; and

U1, U2 up to Un are the utilizations at each minute between U1 and Un, and U1 and Un are adjacent data points on the graph.

Cluster Max Utilization Percentage

Cluster max utilization percentage is defined as the percentage of times that the cluster utilization is above a certain amount (e.g., 70 percent). It may be calculated using the formula:

$$P=(M*100)/T$$

Where

P is the percentage of times cluster utilization is above 70 (for example);

T is the total number of data points in the time period; and

M is the number of the data points, where utilization is above 70% of the allocation for each data point. M may be derived using the formula.

$$M = \sum_{t \leq k \geq n} [((u_k * 100)/a_k) \geq 70)]$$

Where:

k is the minute from start of the time period till the end of the time period;

$u_k$ is the actual utilization at a given time k; and $a_k$ is the actual allocation at a given time k.

Cluster Min Utilization Percentage

Cluster min utilization percentage is defined as the percentage of times, the cluster utilization is below a certain amount (e.g., 30 percent). It may be calculated using the formula $$P=(M*100)/T$$

Where:

P is the percentage of times cluster utilization is below 30 (for example);

T is the total number of data points in the time period; M is the number of the data points, where utilization is below 30% of the allocation for each data point. M may be derived using the formula.

$$M = \sum_{1=k=n} [((u_k * 100)/a_k) < 30)]$$

where:

k is the minute from start of the time period till the end of the time period;

$u_k$ is the actual utilization at a given time k; and $a_k$ is the actual allocation at a given time k.

Cluster Average Utilization Percentage

Cluster average utilization percentage is defined as the utilization percentage of all the data points during a given time period over the allocation. It may be calculated using the formula $$Gp=(S*100)/A \text{ and } S=(U_1+U_2+\ldots Un)/T$$

Where:

Gp is the average utilization percentage;

A is the allocation of the most recent data point;

S is the average utilization value for all data points;

$U_1, U_2 \ldots U_n$ are the utilizations at each minute; and

T is total number of data points in a given time period.

Credits/Debits

Day-wise Credits/Debits is the net utilization in a given day, which is calculated for each tenant based on their allocations and utilizations. Day-wise Credits/Debits may be calculated using the formula:

Sum of the all the values of net utilization (allocation—utilization) at each minute in a given day:

$$D = \sum_{1=k=n} f(k)$$

where:

k is the minute from start of the day till end of the day;

n is the minute for the end of the day (typically 1440 minutes);

f(k) is the Net Utilization calculation, which is Allocation minus Utilization at any given minute k; and D is day-wise credits/debits represented in GBMinutes/day for memory and VcoresMinutes/day for Vcores.

Month-wise Credits/Debits is the net utilization in a given month, which is calculated for each tenant based on their allocations and utilizations. Month-wise Credits/Debits may be calculated using the formula:

Sum of the all the values of net utilization (allocation—utilization) at each minute in a given month $$M = \sum_{1=k=n} f(k)$$

where:

k is the minute from start of the month till end of the month;

n is the minute for the end of the month;

f(k) is the Net Utilization calculation, which is Allocation minus Utilization at any given minute k; and M is month-wise credits/debits represented in GBMinutes/month for memory and VcoresMinutes/month for Vcores.

Year-wise Credits/Debits is the net utilization in a given year, which is calculated for each tenant based on their allocations and utilizations. Year-wise Credits/Debits may be calculated using the formula:
Sum of the all the values of net utilization (allocation—utilization) at each minute in a given month $$Y = \sum_{1=k=n} f(k)$$

where;
k is the minute from start of the year till end of the year;
n is the minute for the end of the year;
f(k) is the Net Utilization calculation, which is Allocation minus Utilization at any given minute k; and
Y is the year-wise credits/debits represented in GBMinutes/year for memory and VcoresMinutes/year for Vcores.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for new tenant onboarding, comprising:
in an information processing apparatus comprising at least one computer processor:
determining new tenant resource requirements for a new tenant;
determining resource commitments for a cluster;
determining a historical resource usage for the cluster;
determining that the cluster has sufficient resources to onboard the new tenant based on the new tenant resource requirements, the resource commitments for the cluster, and the historical resource usage for the cluster; and
onboarding the new tenant to the cluster,
wherein the new tenant resource requirements are based on a dataset size.

2. The method of claim 1, wherein the new tenant resource requirements comprise a new tenant memory requirement, a new tenant Vcore requirement, and a new tenant storage requirement.

3. The method of claim 1, wherein the new tenant resource requirements are based on a workload type.

4. The method of claim 3, wherein the workload type comprises batch, streaming, or archive.

5. The method of claim 1, wherein the resource commitments for the cluster is based on a service level agreement for the cluster.

6. The method of claim 1, wherein historical resource usage data for the cluster is retrieved from a database.

7. The method of claim 1, wherein the historical resource usage is based on an average resource usage over a period of time.

8. The method of claim 1, further comprising:
updating the resource commitments for the cluster with the new tenant resource requirements.

9. A method for new tenant onboarding, comprising:
in an information processing apparatus comprising at least one computer processor:
  determining new tenant resource requirements for a new tenant;
  determining resource commitments for a cluster;
  determining a historical resource usage for the cluster;
  determining that the cluster does not have sufficient resources to onboard the new tenant based on the new tenant resource requirements, the resource commitments for the cluster, and the historical resource usage for the cluster;
  allocating additional resources to the cluster; and
  onboarding the new tenant to the cluster,
    wherein the new tenant resource requirements are based on a dataset size.

10. The method of claim 9, wherein the new tenant resource requirements comprise a new tenant memory requirement, a new tenant Vcore requirement, and a new tenant storage requirement.

11. The method of claim 9, wherein the new tenant resource requirements are based on a workload type.

12. The method of claim 11, wherein the workload type comprises batch, streaming, or archive.

13. The method of claim 9, wherein the resource commitments for the cluster is based on a service level agreement for the cluster.

14. The method of claim 9, wherein historical resource usage data for the cluster is retrieved from a database.

15. The method of claim 9, wherein the historical resource usage is based on an average resource usage over a period of time.

16. The method of claim 9, further comprising:
updating the resource commitments for the cluster with the new tenant resource requirements.

* * * * *